United States Patent [19]
Reedy et al.

[11] 4,098,382
[45] Jul. 4, 1978

[54] LUBRICATED BEARING FOR AUTOMATIC TRANSMISSIONS

[75] Inventors: Lonnie T. Reedy; Eddie Smith, both of Freeport, Tex.

[73] Assignee: Reedy and Smith, Inc., Lake Jackson, Tex.

[21] Appl. No.: 692,432

[22] Filed: Jun. 3, 1976

[51] Int. Cl.$^2$ .................. F16D 25/06; F16D 13/74
[52] U.S. Cl. ............................ 192/110 B; 74/763; 408/202
[58] Field of Search ........... 192/110 B, 85 AA, 87.11, 192/87.15; 74/763

[56] References Cited

U.S. PATENT DOCUMENTS

| | | | |
|---|---|---|---|
| 2,583,556 | 1/1952 | Fleischel | 192/85 AA X |
| 2,748,622 | 6/1956 | Syrovy et al. | 74/763 |
| 3,307,430 | 3/1967 | Bauder | 192/87.11 X |
| 3,554,057 | 1/1971 | Michnay et al. | 192/87.11 X |
| 3,862,581 | 1/1975 | O'Malley | 74/763 X |

FOREIGN PATENT DOCUMENTS 1,093,488  11/1954  France .................. 192/85 AA

*Primary Examiner*—Benjamin W. Wyche

[57] ABSTRACT

Increased resistance to excessive wear rate is provided in certain automobile automatic transmissions by providing a combination of radial-bushing and thrust-washer at a certain position on the oil pump stator where the customarily manufactured transmission is provided only with a thrust-washer. The combination of radial-bushing and thrust-washer provides bearing surfaces for the direct clutch drum to revolve against in both the lateral and radial directions.

5 Claims, 6 Drawing Figures

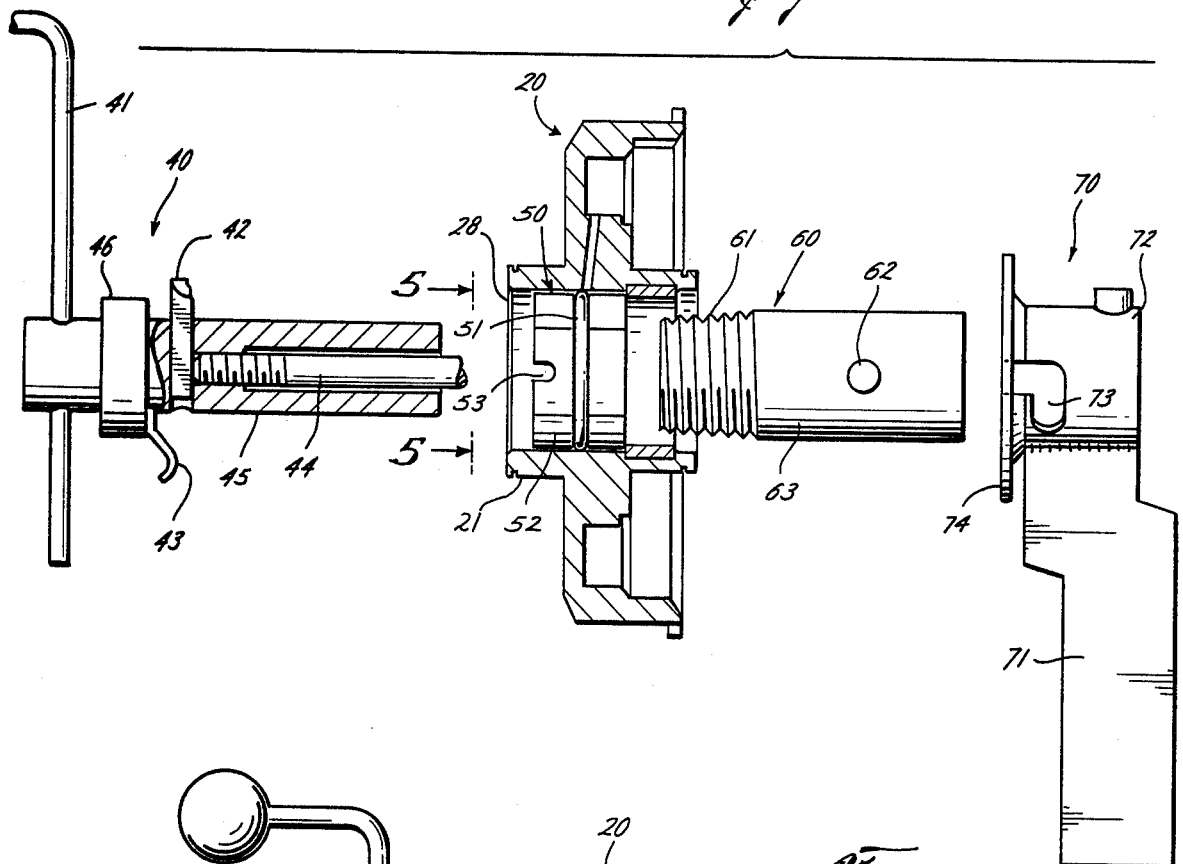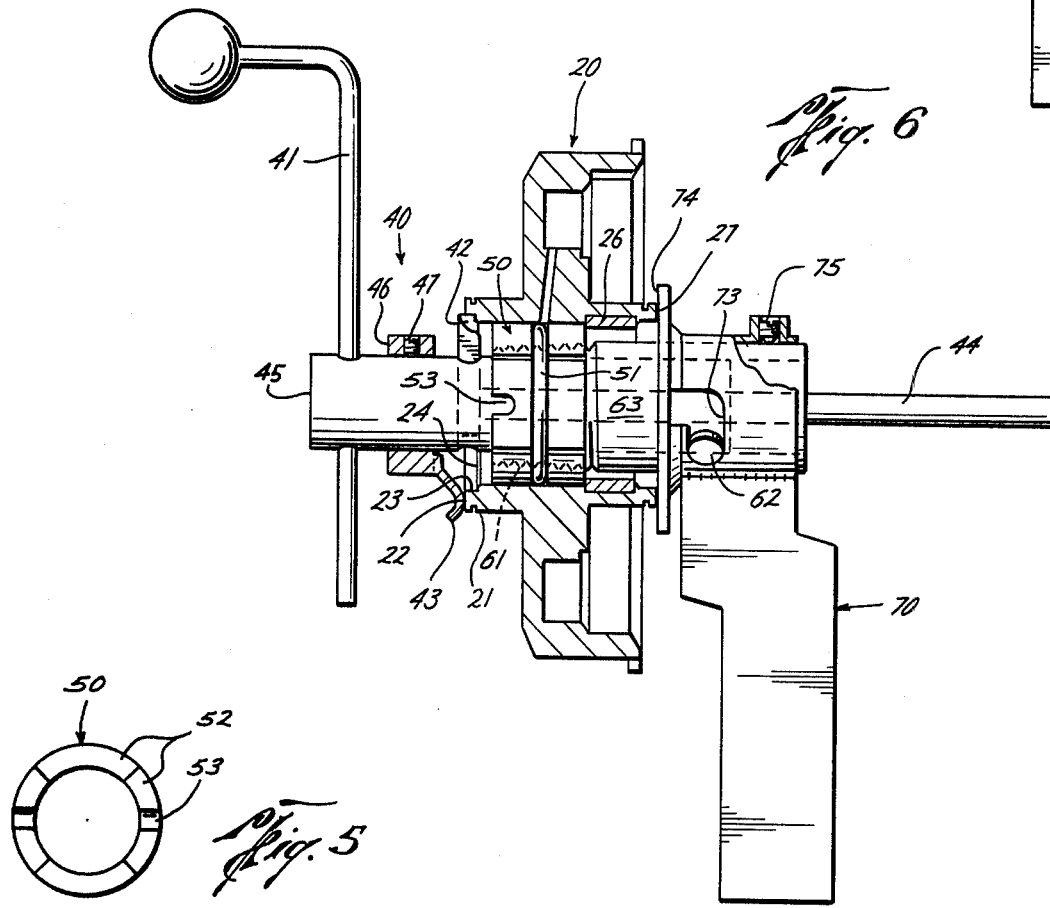

LUBRICATED BEARING FOR AUTOMATIC TRANSMISSIONS

BACKGROUND OF THE INVENTION

There are certain automobile automatic transmissions which are manufactured with a thrust-washer encircling the oil pump stator shaft which protrudes through, and is an integral part of, the pump cover in the oil pump assembly. The thrust-washer is located on the pump stator shaft on the rear side of the pump cover which is the side distal (rearward) from the engine. The stator shaft on the side of the pump cover on said distal side is several inches in length and is provided with the said thrust-washer followed by oil seal rings located sequentially in separate parallel radial grooves encircling the stator. Following that is a bearing surface encircling the stator and following that there are more oil seal rings. Onto this stator shaft the direct clutch drum is positioned so that the stator shaft, carrying the oil seal rings and bearing surface, is snugly enclosed within the inner circumference of the direct clutch drum. The inner circumference of the direct clutch drum (which we shall also call a "rotor") has a surface which is prepared as a bearing surface and which aligns with the bearing surface which encircles the stator shaft. When assembled, the frontal portion of the direct clutch drum, which is cylindrical in appearance and which protrudes through the main body of the direct clutch drum, is rotatable around the stator shaft and the frictional forces are carried radially by the bearing and laterally by the thrust-washer.

Since the direct clutch drum is subjected to high rpm speeds, it is necessary that there be a steady flow of oil to the bearing surfaces, to the surfaces in contact with the thrust-washer, to the oil seal rings and to the other parts which form the remainder of the oil pump assembly and the clutch drum. The oil is supplied by the oil pump assembly and is forced at high pressure through channels within the walls of the stator shaft and through small holes or ports to the areas between the stator shaft and the rotor.

A common cause of transmission failure is the wearing of the thrust-washer which allows lateral "play" or looseness in the fast turning rotor. This "play" becomes a "wobble" and the customary bearing surface is rapidly worn away. This wobbling of the clutch drum also causes rapid wearing of the oil seal rings and also causes excessive wear of the stator shaft in the area of the thrust-washer. Wearing of the inside periphery of the rotor can also occur. This wearing away causes loss of oil pressure, needed to operate the clutches, and this results in overheatng. The overheated oil tends to vaporize and lose its ability to lubricate and the oil rings often become "heat-welded" to the stator, thus causing excessive wear, and even gouging, of the inner circumference of the rotor. Furthermore, the loss of oil pressure and the overheatng causes damage to other parts of the transmission. The cost of overhauling such a damaged transmission and replacing the damaged parts often runs into the hundreds of dollars.

Various attempts have been made by manufacturers of the transmissions to improve the wear rate of the thrust-washers, and have even tried using "needle-washers" which are assembled much like small bar-bearings positioned in a plane parallel to, and between, two flat washer surfaces. Repair kits have been sold which employ "shims" to take up the slack in the thrust direction by supplementing the thickness of the thrust-washer. These attempts to improve the wear rate in the area of the thrust washer have been, in the long run, substantially ineffective.

The transmissions which are improved by the present invention are, e.g., of the type known as Turbo Hydramatic 250 and 350. Also Ford-o-Matic C-4 and other similar transmissions while differing slightly in the manner in which the stator and the rotor are designed, still suffer from essentially the same kind of wear at a similar thrust washer, and are also improved by applying the concept and features of the present invention.

It is an object of the present invention to improve the wear-rate of the automatic transmissions known as Turbo Hydra-Matic 250 and 350 and Ford-o-matic C-4 and others which have similar stator shaft/rotor assemblies.

It is another object to improve the wear-rate at the union of the stator shaft and rotor of said transmissions.

Another object is to provide a radial-bushing around the stator shaft on which the rotor turns and which is juxtapositioned with the thrust-washer; the radial bushing supplements the existing bearing on which the rotor turns.

Still another object is to improve the manufacture of said transmissions by modifying the stator to receive a radial-bushing encircling its frontal outer circumference, juxtapositioned with the thrust-washer when the transmission is assembled.

Yet another object is to provide a combination thrust-washer and radial-bushing for use with modified existing stator shaft/rotor assemblies.

A still further object is to provide tooling specially designed to allow easy modification of existing rotor designs so as to enable the existing rotor designs to receive the radial-bushing of the present invention.

These and other objects are attained by the present invention which is described and illustrated herein.

SUMMARY OF THE INVENTION

In accordance with the present invention certain automobile automatic transmissions (identified hereinafter) are improved in their ability to resist wear bu providing a load-bearing radial-bushing encircling the stator shaft and within the inner surface of the frontal end of the rotor at a location which is juxtapositioned with the thrust-washer. The thrust-washer encircles the stator shaft immediately behind the pump cover, through which the stator shaft protrudes at a central position, and provides a bearing surface for receiving the lateral thrust of the rotor as it rotates. The load-bearing radial-bushing provides a radial bearing surface of the frontal portion of the inner circumference of the rotor. The terms "stator shaft", "rotor", "thrust-washer", "radial-bushing", and other terms used herein will be better understood from the attached drawings and the detailed description which follows.

FIG. 1 depicts an expanded view, generally, of a pump cover and stator shaft assembly 1 in a left oblique perspective, a combination thrust-washer and radial-bushing 10 in a left-oblique perspective, and a direct clutch drum 20 in a right-oblique perspective.

FIG. 2 depicts, generally, a cross-sectional view of the pump cover and stator shaft assembly 1, the combination thrust-washer and radial-bushing 10, and the direct clutch drum 20 in assembled form.

FIG. 3 depicts a cross-sectional view of the combination thrust-washer and radial-bushing 10 whereby important features are shown in greater detail than in FIGS. 1 and 2. The dimensions in FIG. 3 more closely approximate the true dimensions of the combination thrust-washer and radial-bushing than the view of 10 in FIGS. 1 and 2. It has the general appearance and configuration of a short cylinder having a flanged end.

FIG. 4 depicts an expanded view, generally, of a cutting tool 40, a direct clutch drum 20, a cutting-tool centering device 50, shown disposed within drum 20, a threaded speader device 60 for screwing into, a & tightening of, said centering device 50 in said drum 20 and a tool-mounting device 70 for securing said spreader device 60 in a stable position during operation of said cutting tool 40.

FIG. 5 depicts a frontal view, generally, of the cutting-tool centering device 50.

FIG. 6 depicts, generally, the parts of the expanded view (FIG. 4) as assembled and at the finish of the cutting operation.

The drawings do not depict the many other parts of the transmissions, nor do the drawings depict all possible embodiments of the invention. The drawings are not to exact scale, but substantially depict relative dimensions of the parts in combination.

As used herein the expression "lateral" is used to described the thrust force having a direction which is parallel to the axis of the rotor and "radial" is used to described the forces having vector directions which are normal (i.e., at right angles) to the axis of the rotor. The term "rotor" is used to describe that portion of the direct clutch drum throught which the stator shaft extends when the transmission is assembled. The term "stator shaft" is the commonly accepted name of the part around which the direct clutch drum revolves.

DETAILED DESCRIPTION OF THE INVENTION

Figure 1:
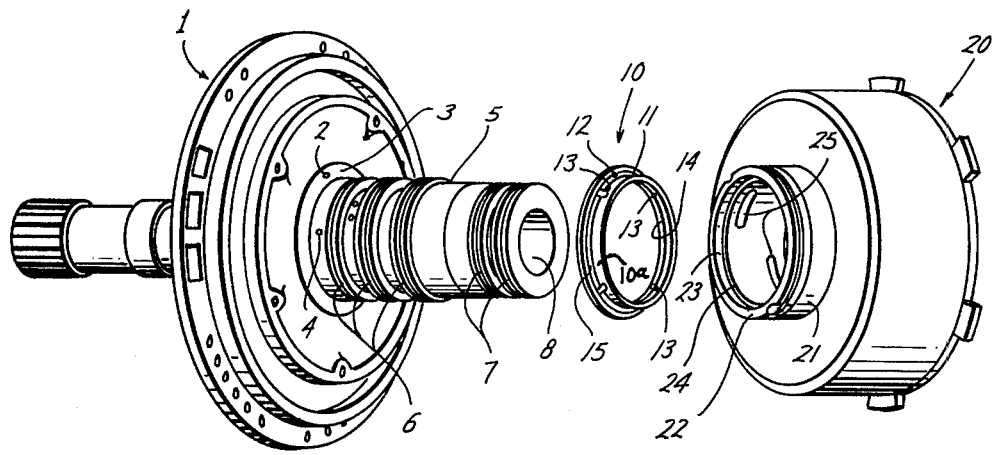

In FIG. 1, the pump cover and stator shaft assembly 1 has oil ring grooves 6 encircling the stator shaft. Following that is bearing surface 5 encircling the stator shaft. Following that are more oil ring grooves 7 near the distal end of the stator shaft. By "distal end" it is meant the end extending rearwardly away from the engine. The stator shaft is hollow 8 for its entire length. On the rear face of the pump cover there is a surface 3 against which the thrust-washer normally is placed and against which the combination thrust-washer and radial-bushing 10 will be placed when installed. A protruding pin 2 is depicted on surface 3 which fits into pin-hole 12 on the combination thrust-washer and radial-bushing 10 when it is installed. This helps hold the bushing 10 in place during installation and prevents it from revolving around the stator shaft when the transmission is in operation. Alternate means for securing the bushing 10 may be employed; for example, a protruding key on bushing 10 which fits into a key-slot juxtapositioned to surface 3 may be employed. There are oil holes on the external surface of the stator shaft which communicate with oil channels built within the wall of the hollow stator shaft; these channels are not shown on the drawing. For purposes of describing the present invention only oil hole 4 is indicated as it must communicate with oil-groove 14 on the inside periphery of bushing 10.

Also in FIG. 1, the combination thrust-washer and radial-bushing 10 is characterized as having a thrust-washer portion 11 and a radial-bushing portion 10a. An oil groove 14 encircles the inside periphery of portion 10a and an oil groove 15 encircles the distal surface of the thrust-washer portion 11. In each case, the oil grooves shown as 14 and 15 are located substantially midway of the surfaces on which they are located. A hole 12 through thrust-washer portion 11 will receive pin 2 when the bushing 10 is placed in position on the stator shaft against surface 3. Also, when installed in place oil groove 14 will communicate with oil hole 4. Oil passageways 13 communicate from oil groove 14 to oil groove 15. The perspective of 10 in FIG. 1 depicts four such passageways 13, but the number is not critical. The purpose of passageways 13 is to direct some of the pressurized oil from oil hole 4 which flows into oil groove 14 to reach bushing surface 10a and to flow into oil groove 15; it is possible to employ only one such oil hole 13, but a plurality of two or more holes is preferred. The oil reaching bushing surface 10a and oil groove 15 provides lubrication for the thrust-washer portion and radial-bushing portions against which the snugly-fitting surfaces 22 and 23 of the direct clutch drum 20 will revolve when in operation in a transmission.

Also in FIG. 1, direct clutch drum 20 is shown to have a cylindrically-shaped center portion extending toward the stator shaft 1 which is called, in this disclosure, a rotor 21. The rotor 21 is seen to have a frontal face surface 22, and an inside reamed-out surface 23 which surface has a greater radial distance from the center axis of rotor 21 than does the adjacent inner surface of the cylindrical rotor through which oil holes 25 communicate. There is a bevelled edge 24 where the inner surface of the rotor 21 meets the reamed-out portion of which surface 23 is a part. When the direct clutch drum 20 is assembled onto the stator shaft 1, the radial-bushing surface 10a supplies a bearing surface against which surface 23 revolves. Ordinarily surfaces 23 and 10a are aligned parallel to the axis of the revolving direct clutch drum 20, but if bushing surface 10a is slanted from such parallel alignment, then surface 23 must also be slanted in order that the two surfaces will match together to get good bearing wear-rates. The drawings do not depict a bearing surface 23 of a different metal than drum 20, but it will be obvious to practitioners of the pertinent art that a bushing material can be inserted into the rotor 21 at surface 23 if desired. It is desirable that the radial-bushing 10a have a thickness great enough that it not be easily damaged or deformed during normal handling and installation and in order that it not wear out quickly. It is also desirable that the rotor 21 not be reamed out, in order to get surface 23, to such an extent that the thickness of the wall of the rotor be unduly weakened by being made too thin. In any event the thickness of the radial-bushing and the reamed-out portion of the rotor should be correlated carefully in order that the bearing surfaces be snugly fitted, but without binding. A very close tolerance, taking into account the thin coating of oil which will flow across bearing surface 10a is desirable. Machining to the proper tolerance range is within the skill of machinists.

The bevelled edge 24 inside rotor 21 is helpful in assembling the rotor when the oil rings are in position in oil grooves 6 and 7. In assembling parts 1, 10, and 20, part 10 is slid onto the stator shaft and held in place by pin 2. Then the oil rings 6 and 7 are installed on the stator shaft. These oil rings fit tightly inside the rotor when the rotor is in position, so if the bevelled edge 24 is not employed, it is difficult to slip the rotor past the oil rings.

In actual assembly of a complete transmission there are numerous other parts which will be installed along with the pump cover and stator shaft 1 and the direct clutch drum 20, but since such installation of other parts is not affected by the present invention, there is no need to discuss the other parts in this disclosure.

Figure 2:
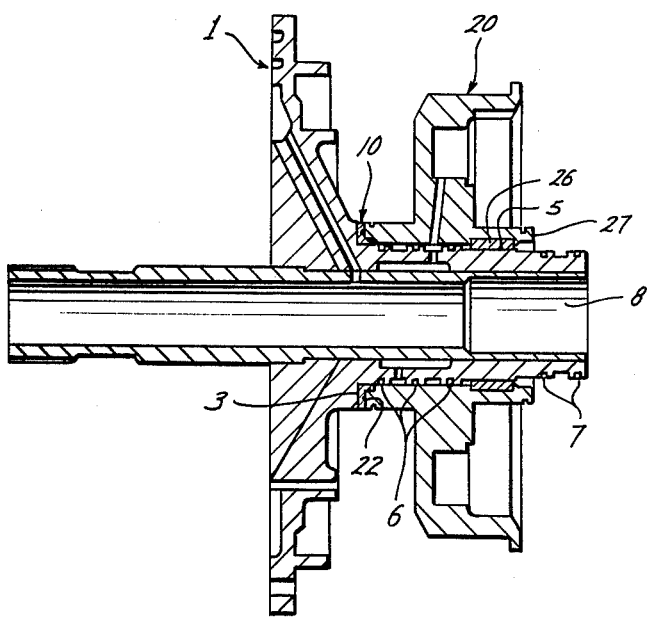

FIG. 2 is a cross-sectional view depicting, in general, an assembly of the pump cover and stator shaft 1, the combination thrust-washer and radial-bushing 10 and the direct clutch drum 20. The figure demonstrates that part 10 is in position on the stator shaft against surface 3 and that drum 20 is in position against the bushing part 10 with surface 22 being against the thrust-washer portion 11. Surface 23 is in position against bushing surface 10a. Oil rings 6 are in position within rotor 21. In this figure there is shown a bearing surface 26 which is inside rotor 21 and is in position against the bearing surface 5 of the stator shaft; this bearing surface 26 is not in view in the perspective drawing of drum 20 in FIG. 1. Note that bearing surface 26 is near the distal end of rotor 21. In customarily manufactured transmissions, this bearing surface 26 is often the sole bearing surface designed to carry the radial forces of the drum as it revolves at high speed. This generally is not a sufficient amount of bearing surface for such rigorous surface, especially since the bearing is near one end of the rotor. Efforts to control the "wobble" at the frontal portion of the rotor by the use of thrust-washers does not, in many cases, provide sufficient durability.

The present invention, which provides a radial-bushing 10a in the frontal portion of the rotor 21, in addition to the thrust-washer, improves the wear rate of such transmissions by providing protection against "wobble" of the rotor which normally accompanies normal wear of the bearing surfaces 26 and 5.

Figure 3:
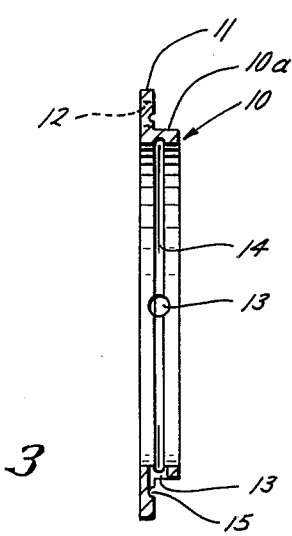

FIG. 3 is an enlarged, cross-sectional view of the combination thrust-washer and radial-bushing 10 which is shown in perspective in FIG. 1. The oil grooves 14 and 15 and oil holes 13 are more clearly depicted. Also the location of pin-hole 12 is more clearly shown. These radial-bushings are preferably made of a durable material, e.g., bronze or other copper alloy, which is different from the cast ferrous metal from which the stator and rotor are made. Babbitt metal may be employed, if desired. Other means for providing for oil flow on the surfaces of the thrust-washer and radial-bushing will be apparent to those of skill in the relevant arts.

FIG. 4 depicts a cutting tool 40, a centering device 50, said centering device 50 being positioned within the rotor 21 of direct clutch drum 20. Also shown is a threaded spreader device 60 and a tool-mounting device 70. Cutting tool 40 has a handle 41 for rotating the cutting bit 42 made of suitable metal, a depth-setting stop device 43 which is used to regulate the depth to which the cutting bit 42 can travel, an adjustable collar 46 encircling the shaft 45 to which handle 41 is attached, the collar 46 being held in position by a set-screw (as seen in FIG. 6), a threaded rod 44 extending into a hollowed-out cylindrical portion of shaft 45, said hollowed-out portion extending into shaft 45 until it reaches the cutting bit 42. The cutting bit 42 is inserted into a hole extending through shaft 45 and is adjustable as to how far it protrudes from shaft 45 and is held securely at its desired setting by the threaded rod 44 which is screwed into threads provided therefor within the hollowed-out portion of shaft 45. The cutting-tool centering device 50 depicted in FIG. 4 (and in FIGS. 5 and 6) is a self-centering assembly of elongate arc segments 52 held together by a rubber O-ring 51. The centering device 50 is conveniently provided with notches 53 for receiving the prongs of a two-pronged spanner wrench which can be used in tightening the centering device 50 onto the tapered threads of spreader device 60. As the spreader device screws into the centering device 50, which has threads inside the arc segments, the arc segments spread apart until they fit tightly inside the rotor 21. This tightly fitted centering device, premachined so that its cylindrical shape is concentric with the axis of the rotor, provides a means for guiding the cutting tool as the reaming of the rotor is done. The spreader device 60 has a pin 62 protruding from the main body 63. Body 63 is of a length sufficient to protrude from the distal end of rotor 21 in order that the spreader device 60 can be fitted into a holding device or tool-mounting device 70. Pin 62 is located on the spreader device in a convenient location for insertion into a pin-slot 73 which is a part of the tool-mounting device 70. In one actual embodiment there is another pin 62 located on the other side of the main body 63 of the spreader device 60, but this second pin is not depicted in the drawings. Such second pin requires that there be a second pin-slot 73 on the other side of mounting device 70 which is not in view.

FIG. 5 depicts an end view of the centering device 50 and shows four arc segments 52 defining a cylindrical shape. Two notches 53 are depicted; these are end views of notches 53 as depicted in FIG. 4. The The rubber O-ring 51 of FIG. 4 is not in view in FIG. 5.

FIG. 6 depicts the cutting tool 40, in operable combination with the centering device 50 which has been spread into place by the threaded spreader-device 60. The centering device is positioned inside the rotor 21 and is tightly fitted therein by the action of the spreader device 60 which has been screwed into the centering-device. Furthermore in FIG. 6 it is shown that the main body 63 of the spreader device 60 is positioned in the mounting device 70 with pin 62 being inserted into L-shaped pin-slot 73 and turned into position. Set screw 75 helps hold body 63 securely in the mounting device 70. Note that the mounting device 70 has a flanged face 74 which fits snugly against surface 27 of rotor 21. Thus, when assembled, rotor 21 is securely held with respect to the centering device 50, the spreader device 60, and the mounting device 70. Mounting device 70 is conveniently provided with a strong, flat protusion or arm 71 which can be tightly held in a vise or other convenient holding apparatus.

Also in FIG. 6 it is shown that the cutting tool 40 is positioned in place by having shaft 45 inserted through centering device 50 with rod 44 extending on through and beyond mounting device 70. The cutting bit 42 is shown in position at the end of its cutting chore, with the stop device 43 resting against the frontal face surface 22 of rotor 20. In actual practice it is preferred to have the cutting bit 42 shaped so as to provide bevelled edge 24 at the same time it provides surface 23.

The present invention contemplates the use of a compressed helical spring (not shown in the drawings) for exerting a pulling force on rod 44. Referring to FIG. 6, the compressed spring is slid onto rod 44 and is fastened at the distal end thereof by a pin, clip, screw or other suitable means. The compressed spring pushes against the distal end of spreader device 60 which protrudes through mounting device 70. This forces cutting bit 42 against surface 22 of rotor 21 so that when handle 41 is turned, cutting bit 42 reams out a portion of the inside wall of rotor 21, thereby creating the desired new surface 23. When the desired depth of the cut is reached, the stop device 43 comes to rest against surface 22. Means other than such compressed spring may be employed for forcing cutting bit 42 against surface 22, such as the use of positive pressure against the frontal end of tool 40.

The use of a specially designed reaming tool such as is depicted in FIGS. 4 and 6 is an important feature conducive to the wide-spread adaptation of the present invention. There are a large number of transmission repair shops which would be enabled to modify existing direct clutch drums for receiving the radial bushing 10 of the present invention by the use of a tool specially designed for that purpose and easy to operate. Very few of such repair shops would be expected to own suitable power lathes for performing such modifications to the direct clutch drum; it would add to the expense of modifying or repairing transmissions if the repairman must take the lathe work to a machinist. The cutting tool 40, which may be considered a hand-operated lathe, may be built inexpensively and could be employed many times, only the cutting bit 42 has a substantially limited life and, depending on the tool quality of the metal from which it is made, may need to be replaced or re-sharpened after several cuts.

It can be seen then from the foregoing description and explanation that the present invention involves method and means for improving the wear-rate of certain transmissions. The improvement comprises providing a radial-bushing on the stator shaft around which the rotor of the direct clutch drum revolves, said radial-bushing being juxtapositioned with a thrust-washer at a place on the stator at which customarily manufactured transmissions have only a thrust-washer; the improvement also comprises modification of the direct clutch drum by reaming out a portion of the rotor of the drum so as to receive the radial-bushing, a specially designed cutting tool being provided for that purpose. The present invention also contemplates a modification kit of materials for the practice of the present invention, said kit comprising a cutting tool 40, a centering device 50 for proper position of said cutting tool 40, a spreader device 60 for positioning said centering device 50 securely within the rotor of the direct clutch drum, a mounting device 70 for securely mounting the direct clutch drum in operable combination with the centering device and the spreader device, and optionally, one or more combination thrust-washer and radial-bushings 10.

The transmissions which are improved by the present invention are of the kind which have a direct clutch drum revolving around a stator shaft and which are customarily provided with a radial-bearing surface only at, or near, the distal end of the inner surface of the rotor of said drum, the revolving rotor having only a thrust-washer as a bearing surface at the frontal end of said rotor when installed on said stator shaft.

The present invention also contemplates modifying such transmissions for, or during, the manufacture thereof so as to provide a radial-bushing juxtapositioned with a thrust-washer at the frontal end of the rotor of the direct clutch drum, the radial-bushing providing a radial bearing for the rotor to supplement the customarily provided radial bearing near the distal end of said rotor, the thrust-washer supplying a bearing surface for the frontal end face of said rotor for receiving the thrust forces which are parallel to the axis of the rotor.

Terminology used for various customary parts described herein is consistent with that which is used in, e.g., *Motor's Automatic Transmission Manual,* 5th Edition, 1973, published by the Hearst Corporation. In that manual see, in particular, pages 601–603 for illustrations of a direct clutch drum and a pump cover and stator shaft assembly.

Persons skilled in the arts pertaining to the present inventipn will be able, having learned of this invention, to determine alternate embodiments to those disclosed here without departing from the spirit and scope of the present invention. The embodiments herein are to illustrate the invention and its various parts; the scope of the invention is limited by the claims, not by the particular embodiments described.

We claim:

1. In an automobile automatic transmission which is characterized as having a direct clutch drum revolvable around a stator shaft and in which the inner surface of the rotor portion of said direct clutch drum is revolvable around a radial bearing surface encircling said stator shaft at a location which is near the distal end of said rotor portion, said stator shaft being characterized as having an oil-flow outlet communicating from the inside of the stator shaft to the external surface of the stator shaft at a location within the frontal end of said rotor portion, the improvement which comprises providing a circular combination thrust-washer/radial-bushing encircling the stator shaft to serve as a bearing for the frontal end of said rotor portion, said combination thrust-washer/radial-bushing having the configuration of a short cylinder having a flanged end, and being of a dimension to fit snugly around the stator shaft, said flanged end having a distal surface which is operable as a thrust-washer portion for receiving the thrust forces of the frontal end of the rotor as it rotates, said short cylinder having a radial surface in a position distal to the thrust-washer portion which is operable as a radial-bushing portion for the inside frontal periphery of the rotor, said combination thrust-washer/radial-bushing having oil-flow means comprising a first oil groove inscribed aroung the inner periphery of the radial-bushing portion, said first oil groove communicating with the oil outlet on the stator shaft, with at least one oil passageway communicating through said radial-bushing to provide flow of oil from the first oil groove to the outer surface of the radial-bushing, and a second oil groove inscribed around the distal surface of said thrust-washer portion with at least one oil passageway communicating from said outer radial-bushing surface to said second oil groove.

2. The improved transmission of claim 1 wherein the direct clutch drum was originally manufactured so as to have only one radial bearing site, this one radial bearing site being located near the distal end of the inner periphery of the rotor portion of said direct clutch drum, and wherein said direct clutch durm is modified so as to be provided with a radial-bushing site at the frontal inner periphery of said rotor portion, said modification comprising a reamed-out portion of said frontal inner periphery, said reamed-out portion defining an inner surface of said rotor which is at a radius slightly greater from the axis of said rotor than is the remaining inner periphery surface which is not reamed-out.

3. The improved transmission of claim 1 wherein the transmission is of the type selected from the group consisting of Turbo Hydra-matic 250, Turbo Hydra-matic 350, and Ford-o-matic C-4.

4. The transmission of claim 1 wherein the transmission is a Turbo Hydra-matic 250 or Turbo Hydra-matic 350.

5. The transmission of claim 1 wherein the transmission is a Ford-o-matic C-4.

* * * * *